H. C. BJERING.
MOWER.
APPLICATION FILED MAY 26, 1911.
1,089,039.
Patented Mar. 3, 1914.
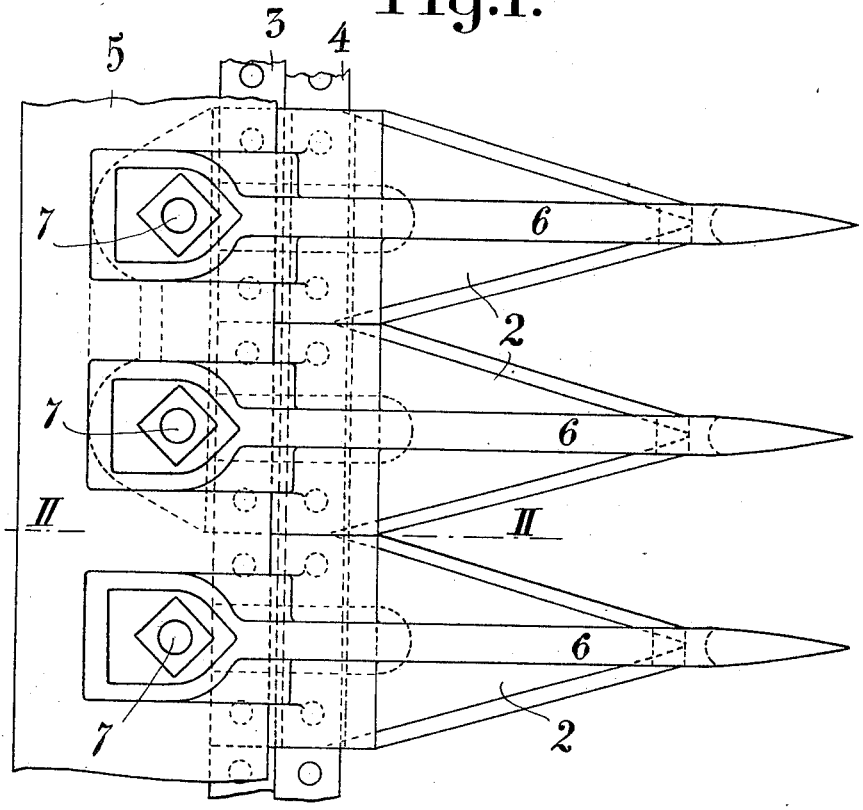
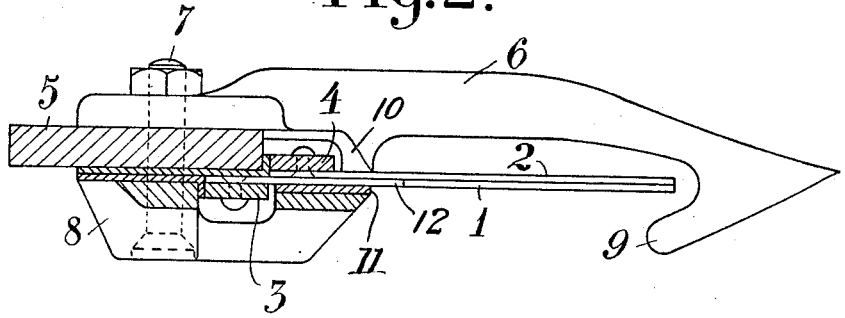

UNITED STATES PATENT OFFICE.

HANS CHRISTIAN BJERING, OF GJÖVIK, NORWAY, ASSIGNOR TO KRISTIAN HALMRAST, OF SÖNDRE LAND, NORWAY.

MOWER.

1,089,039. Specification of Letters Patent. Patented Mar. 3, 1914.

Application filed May 26, 1911. Serial No. 629,658.

*To all whom it may concern:*

Be it known that I, HANS CHRISTIAN BJERING, a subject of the King of Norway, residing at Gjövik, Norway, have invented certain new and useful Improvements in Mowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to mowers of the kind which have two knives mounted one above the other and adapted to reciprocate toward each other, and has reference more particularly to an arrangement of the frame of the cutting apparatus, by which certain drawbacks connected with the machines of this kind hitherto known are avoided. In the known machines of this type, the fingers, which serve to protect the knives, are arranged either on the underside of the knives or both above and below.

In the use of machines with the protecting fingers arranged in this way it has been found that the mowed grass adheres between the fingers and knives and prevents the free motion of the knives. Consequently after a short time the openings between the fingers become clogged with pieces of grass, so that the grass to be cut is prevented from coming into contact with the knives. Eventually, the grass is laid or pressed flat and passes below the knives without being cut. According to the present invention these drawbacks are avoided by arranging the protecting fingers above the knives while the underside thereof is free. In order to maintain a certain distance between the knives and the ground the frame carrying the knives is provided with downwardly projecting heels, which slide on the ground, when the machine is working.

An embodiment of the invention is illustrated in the accompanying drawing, in which—

Figure 1 is a plan of the cutting apparatus and Fig. 2 is a section on the line II—II, Fig. 1.

The knives 1 and 2 (Fig. 2) are secured to the bars 3 and 4 respectively, which are mounted to reciprocate with respect to the knife-holder or frame 5, connected with the machine. The fingers 6 are attached to this frame by means of bolts 7 and washers 8. The bars 3 and 4 are arranged in such relation to one another, that the rear edge of the upper bar 4 is situated directly opposite or somewhat in front of the foremost edge of the lower bar 3. Moreover, the front edge of the bar 4 is situated at some distance from the cutting edges of the knives so that sufficient space is provided for the guide bar 10. The washers have guide bars 11 lying alongside the knives 1 and whose front edges are in alinement as shown. The washers also have such a shape and height that, when sliding along the ground, they hold the knives a suitable distance above the same.

In mowers with two reciprocating knives it is important that the lower knife should be so guided that any pressure which may be applied to the lower knife, will not be transmitted to the upper knife or its guide bar. This, according to the present invention, is accomplished by arranging the guide bar for the lower knife behind the guide bar for the upper knife.

The fingers 6 extend forwardly over and beyond the knives and have a backwardly and downwardly projecting extension 9, shielding the ends of the knives. The lower surface of the washers 8, which is adapted to slide along the ground, is deeper than that part of the nose or extension 9 which lies below the knives, so that the later are held a certain distance above the ground, when the knives are in a horizontal position or in a position substantially parallel with the ground. The fingers at the front are pointed in the usual manner, which pointed portion during the operation of the machine thrusts the grass aside, so as to prevent it from engaging with the ends of the knives, when the latter occupy their extreme positions.

The fingers themselves as will be apparent, play no part in the operation of cutting. The space between the knives and the inner surface of the fingers is such as to prevent the grass from becoming entangled or massed thereat. The rear part of the knife blades 1 has a slot 12, open at the rear end, serving as an outlet channel for earth, sand, grass and the like, which may enter in between the guide bar 11 and the lower knife.

During each stroke of the bars two cuts are effected, one of which takes place just below the fingers, while the other cut takes place between two fingers. In other words, supposing that two knife bars are employed, each of which is provided with three knives, as shown, and that the extent of linear movement of each bar is equal to substantially the distance between the center lines of two adjacent fingers, then during the one movement of the knives the grass will be cut at either side of the center finger by the inverse and oppositely moving edges of the superposed knives, until the center knives move past the center lines between the middle finger and the bars on either side thereof, when the grass will be cut directly under the middle finger by the inverse and coöperating edges of the end knives until such time as the said two end knives are centrally superposed beneath the middle finger; in the return movement of the knife bars from this position the grass is cut on each side of the middle finger, midway between the fingers, until half of the stroke is completed, from which time until the knives occupy their original position, the grass is cut beneath each of the three fingers. When the knives cut below the fingers, grass is collected by the knives, and in consequence thereof, the distance between the knives and the fingers must be such that this grass exerts no influencing pressure, but lies quite loose, so that the greater portion thereof will be forced rearwardly over the knives by the fresh incoming grass. A small portion of the grass, however, would remain on the extension 9, but owing to the shape of said extension will slip off freely so as to prevent accumulation between the fingers and the knives. Consequently the cutting mechanism is maintained quite clean. Thus there will be entirely obviated the clogging and accumulating of grass in the cutting apparatus as in the case of the known machines with two knives, and accordingly the friction set up between the knives in the moving operation is considerably reduced. The fingers may also be constructed and arranged in a different manner to that shown in the drawing, provided they are always arranged on the upper side of the knives only and at some distance therefrom.

I claim—

1. In mowers, the combination of a plurality of knives one superposed relatively to the other, means to reciprocate said knives in opposite directions, and protecting means extending over and at a determined distance from said knives, said protecting means at its forward end having a projection extending around for a relatively short distance under the lower surface of said knives.

2. In mowers, the combination of two knives one superposed with respect to the other, means to impart a reciprocating movement to said knives in opposite directions, and a protecting finger extending over and at a determined distance from the upper surface of said knives and extending at its forward end downwardly and rearwardly slightly under the lower surface of said knives.

3. In mowers the combination of cutting mechanism comprising a plurality of knives disposed one upon the other, protecting means extending over and at a determined distance from the upper surface of said knives, means connected with said cutting mechanism and extending beneath said knives, and means projecting from said projecting means at the forward end thereof and extending downwardly and rearwardly slightly under the lower surfaces of said knives to protect the front ends of said knives, the said projecting means and the said means connected with the cutting mechanism sliding when the mower is in operation along the ground to maintain a determined distance between the knives and the ground.

4. In mowers, the combination of a frame, two knives carried by said frame and disposed one upon the other with the lower knife exposed substantially wholly on its under face, means to reciprocate said knives in opposite directions, protecting fingers extending over the upper surface of said knives, and having their forward ends extending around the front ends of the knives and terminating beneath the under surface of said knives in relatively close proximity to said knife ends to form a heel-like extension, and a member connected with said frame and having its bottom surface below said heel-like extension when the knives lie in a substantially horizontal plane.

5. In mowers, the combination of two knives one superposed with relation to the other, a frame carrying said knives, protecting means extending over the upper surface of said knives to beneath the forward ends thereof, means connected with said frame normally to support said frame and said cutting mechanism, guiding means for the upper and lower knives, upper and lower bars rigidly connected with said knives and located with the rear edge of the upper bar substantially above the front edge of the lower bar, the upper bar being located with its front edge at a distance from the cutting edges of the knives to provide for the accommodation of the said guiding means for the upper knife.

6. In mowers, the combination of a frame carrying a plurality of knives arranged one upon the other, means to reciprocate said knives in opposite directions, protecting means for said knives, separate guiding means for both the upper and lower knives, and upper and lower bars located with the rear edge of the upper bar substantially above the front edge of the lower bar, substantially as described.

In testimony that I claim the foregoing as my invention, I have signed my name in presence of two subscribing witnesses.

HANS CHRISTIAN BJERING.

Witnesses:
MARTIN GUTTOREUSEN,
HENRY BORDENICH.

Copies of this patent may be obtained for five cents each, by addressing the "Commissioner of Patents, Washington, D. C."